United States Patent [19]

Shiga et al.

[11] Patent Number: 5,230,138
[45] Date of Patent: Jul. 27, 1993

[54] METHOD OF MANUFACTURING A METAL-CONTAINED COMPOSITE MATERIAL AND A METAL-CONTAINED COMPOSITE MATERIAL PRODUCED THEREBY

[75] Inventors: Shoji Shiga; Minoru Suzuki; Masanori Ozaki, all of Tokyo, Japan

[73] Assignee: Furukawa Electric Co., Ltd., Tokyo, Japan

[21] Appl. No.: 667,394

[22] PCT Filed: Jul. 26, 1990

[86] PCT No.: PCT/JP90/00949

§ 371 Date: Mar. 22, 1991

§ 102(e) Date: Mar. 22, 1991

[87] PCT Pub. No.: WO91/01954

PCT Pub. Date: Feb. 21, 1991

[30] Foreign Application Priority Data

Jul. 27, 1989 [JP] Japan .................... 1-194835

[51] Int. Cl.$^5$ ............ B22D 11/126; B21B 13/02
[52] U.S. Cl. .................... 29/527.2; 29/898.12; 29/895.3; 419/3; 419/6; 419/8; 419/43; 492/60
[58] Field of Search ........... 29/898.12, 527.2, 110, 29/117; 419/3, 6, 8, 43

[56] References Cited

U.S. PATENT DOCUMENTS

| | | | |
|---|---|---|---|
| 2,187,348 | 1/1940 | Hodson | 29/898.12 |
| 3,152,892 | 10/1964 | Clark | 419/43 X |
| 3,154,844 | 11/1964 | Sayre et al. | 29/898.12 X |
| 3,310,870 | 3/1967 | Parikh et al. | 29/898.12 X |
| 3,445,909 | 5/1969 | Beebe, Jr. | 29/898.12 |
| 4,104,060 | 8/1978 | Johnson | 419/3 |
| 4,121,928 | 10/1978 | Mori | 29/898.12 |
| 4,189,522 | 2/1989 | Mori | |
| 4,602,954 | 7/1986 | Davies | 419/19 X |
| 4,605,599 | 8/1986 | Penrice et al. | 419/28 X |
| 4,680,161 | 7/1987 | Muto | 419/3 |
| 4,758,404 | 7/1988 | Muto | 419/3 |
| 4,961,901 | 10/1990 | Wüllenweber et al. | 419/29 X |
| 5,010,050 | 4/1991 | Wüllenweber et al. | 419/3 X |

FOREIGN PATENT DOCUMENTS

0283877 9/1988 European Pat. Off. .

Primary Examiner—Carl J. Arbes
Attorney, Agent, or Firm—Frishauf, Holtz, Goodman & Woodward

[57] ABSTRACT

This invention relates to a method of producing a metal-contained composite material from a metal and a sinterable material such as a ceramic material, and to a metal-contained composite material produced by the method. Conventional composite materials consisting of metal and ceramic material do not have sufficient mechanical and electrical properties, under some conditions in use, and are too expensive to be applied extensively. To solve this problem, the invention provides a manufacturing method comprising a process of fabricating a roll of a laminate consisting of a metal strip and a sinterable material, by winding up the laminate, and a process of subjecting the roll to plastic working; a manufacturing method including a heat treatment process carried out at a predetermined temperature, in addition to the above processes; and metal-contained composite materials produced by these methods. The metal-contained composite materials produced by the methods of the invention can be suitably used for machine parts, electrical sliding contact materials, electrical and thermal conductors, electromagnetic shielding materials, and the like.

29 Claims, 5 Drawing Sheets

METHOD OF MANUFACTURING A METAL-CONTAINED COMPOSITE MATERIAL AND A METAL-CONTAINED COMPOSITE MATERIAL PRODUCED THEREBY

DESCRIPTION

1. Technical Field

This invention relates to a method of manufacturing a metal-contained composite material to be used for a machine part, electrical sliding contact member, electric and thermal conductor, electromagnetic shielding member and the like, and a metal-contained composite material produced thereby.

2. Background Art

Conventionally, composite materials consisting of metals or of a metal and a ceramic material have been widely used. These composite materials have been developed in an attempt to combine the properties of their components and to acquire properties that cannot be provided by the individual components.

For example, it is known that composite materials, which may be obtained from material powders of W-WC, Ag-C, Ag-CdO, Cu-$Al_2O_3$, Ni-NiO, Al-$Al_2O_3$, etc., have the properties of both metal and ceramic material. These composite materials are wear-resistant, heat-resistant, high in strength, and electrically and thermally conductive, and thus are used for contacts, working tools, mechanical structural members, and the like.

Metal/ceramic composite materials are also known in which a metal is coated with a ceramic material or a ceramic material is metallized. This type of composite materials is used for parts of electronic devices, such as a circuit board, or for machine parts such as a turbine blade.

There are still other composite materials such as a CFRM (ceramic fiber reinforced metal) in which filaments or whiskers of carbon, SiC, $Al_2O_3$, or $K_3TiO_3$ are embedded in a metal, and a MFRC (metal fiber reinforced ceramics) in which metal filaments are embedded in a ceramic material. In these composite materials, the strength and tenacity of the metal or ceramic material are improved.

The above-mentioned various composite materials, however, have such a problem in that the composite materials made from powder material and the metal/ceramic composite materials do not have satisfactory electrical and mechanical properties, though they are inexpensive, while the CFRM and MFRC are costly and are limited in use.

An object of this invention is to provide a method of manufacturing a metal-contained composite material in which the properties of metal and various sinterable materials compounded therewith are fully retained and excellent properties that cannot be acquired by the individual components are obtained. Another object of this invention is to provide a metal-contained composite material having such excellent properties as mentioned before.

DISCLOSURE OF THE INVENTION

To achieve the above objects, according to this invention, there is provided a method of manufacturing a metal-contained composite material, characterized by comprising: a process of fabricating a roll of a laminate, prepared by a lamination of at least one sinterable material on one surface of a metal strip, by winding up the laminate on itself or around a core; and a process of subjecting the roll to plastic working. The method of manufacturing a metal-contained composite material according to this invention will be described hereinafter according to the manufacturing processes.

First, the process of making a roll will be described with reference to the relevant drawings. In this process, a spirally wound roll is obtained by winding up a metal strip, having a sinterable material layer formed on one surface thereof, on itself or around a core. The core material used in this process may be either the same metal as the metal strip or some other metal different therefrom.

When carrying out this process, the metal strip may be wound up while at the same time forming a sinterable material layer on one surface of the metal strip, or a sinterable material layer may be previously formed on one surface of the metal strip before the metal strip is wound up. Of these methods, the former in which the metal strip is wound up while laminating the sinterable material thereon is preferred, because the productivity is higher and the manufacturing cost is lower.

Figure 1:
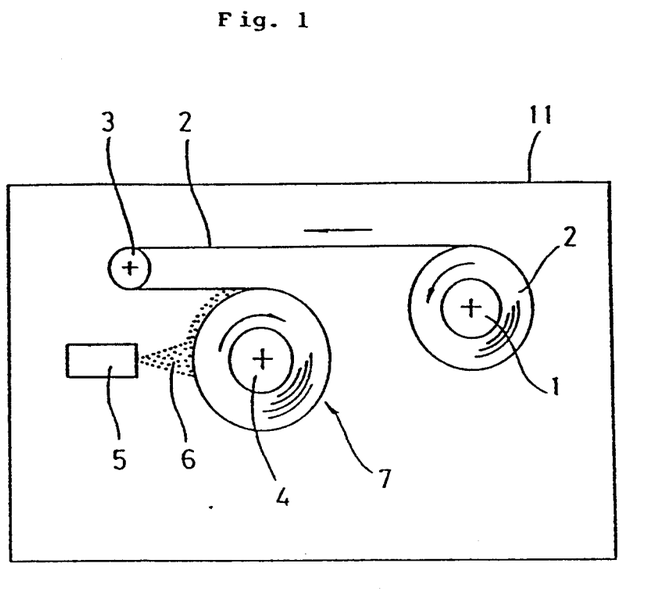
FIG. 1 is a diagram illustrating a method of manufacturing a metal-contained composite material according to this invention.

FIG. 1 is a diagram illustrating the process of making a roll by winding up a metal strip while a sinterable material layer is forming on one surface thereof. In FIG. 1, reference numeral 1 denotes an uncoiler, around which a metal strip 2 is wound. The metal strip 2 wound around the uncoiler 1 is continuously led to a certain direction (indicated by arrow in the figure), the leading direction is swerved in the middle by a turn roll 3, and then the strip is continuously reeled up by a coiler 4. When the metal strip 2 is wound around the coiler 4, a sinterable material 6 is sprayed from a spray gun 5, arranged in the vicinity of the coiler 4, onto the surface of the metal strip 2. These sequence of operations enables forming a cylindrical laminate roll 7 comprising the metal strip 2 and the sinterable material 6. In this process, coating with sinterable material 6 should preferably be avoided from the outer end of the rolled metal strip 2.

Figure 2:
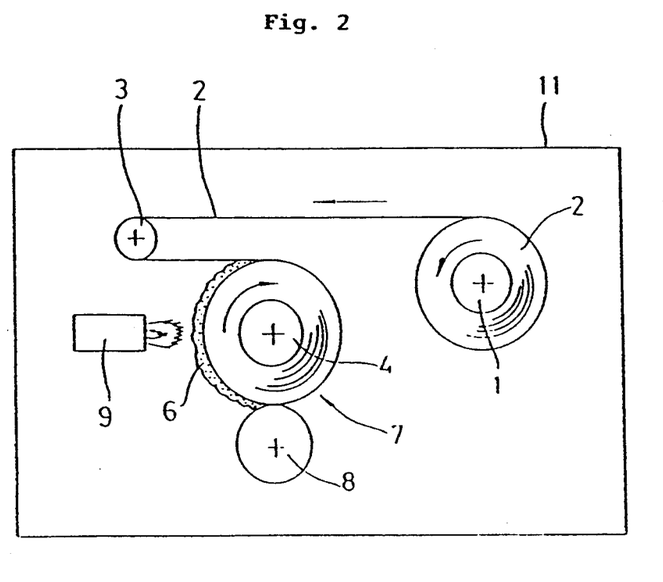
FIG. 2 is a diagram also illustrating the method of manufacturing a metal-contained composite material according to this invention.

FIG. 2 shows a modification of the roll preparation process shown in FIG. 1. The process of FIG. 2 differs from that shown in FIG. 1, only in the means of laminating the sinterable material 6 on one surface of the metal strip 2. In FIG. 2, elements with like reference numerals have the same functions as those appearing in FIG. 1. As shown in FIG. 2, a sinterable material 6, in a slurry state, is applied to a surface of the metal strip 2 by a spreading roll 8, and then dried by a gas burner 9, and the strip 2 is wound around the coiler 4, therefrom results a cylindrical roll 7.

To laminate the sinterable material 6 on a surface of the metal strip 2 in the roll preparation process, various methods can be used, such as PVD methods inclusive of a plasma spraying, thermal spraying, sputtering, vacuum deposition, and ion plating, CVD methods inclusive of a laser beam sputtering, thermal CVD, MOCVD, and plasma CVD, a spray pyrolysis method, a printing method, a dip coating method, a slurry application method, and an electrophoretic deposition method.

In the roll fabrication process, the sinterable material 6 is preferably laminated to even out a thickness over the entire surface of metal strip 2. To be brief, in FIG. 1, a plurality of spray guns may be employed, or a single spray gun may be moved while spraying.

The roll fabrication process is preferably carried out in a sealed vessel (indicated by 11 in the figures), so that the atmosphere can be conditioned in suit with the type of the sinterable material used. For example, when using a plasma spraying method, a low-pressure plasma process is operated under reduced atmospheric pressure at 10 to 500 Torr. This process serves to prevent a metal-contained composite material in production from oxidation, to make the sinterable material layer homogeneous, and to improve the adhesion between the metal strip and the sinterable material layer. Alternatively, a high-pressure plasma may be employed which is easily performable in the atmosphere.

In this invention, a possible combination and ratio of contents in the metal strip and the sinterable material, may be arbitrary to suit for the application of the metal-contained composite material and the type of the sinterable material, as necessary.

The purpose of the metal strip is to embody such properties of the metal-contained composite material, as electrical conductivity, thermal conductivity, ductility, tenacity, weldability, platability, and solderability. In line with this, the material for the embodiment can preferably be of Cu, Al, Ag, Au, Fe, Ni, Co, W, Mo, Nb, Ta, Ti or Zr, or an alloy of some elements out of foresaid metals or an alloy out of Ag-Pd, Cu-Zn, Cu-Sn, Cu-Ni, SUS, Fe-Ni, Fe-Ni-Co, Mo-Cr-Fe, etc.

For the sinterable material, at least one substance may be selected from the group consisting of ceramic materials, electroconductive polymers, metals, and a mixture of ceramic materials and metals. The sinterable material is preferably in the form of powder, for the convenience of manufacture.

Favorable ceramic materials include $Al_2O_3$, SiC, $ZrO_2$, MgO, $BaTiO_3$, $Fe_2O_3$, $MoS_2$, WC, TiC, $TiB_2$, TiN, AlN, glass (soda-lime glass and lead glass), MoSi, ZnN, ZrC, $ZrB_2$, $PbTiO_3$, $NaTaO_3$, $KNSO_3$, $NaNbO_3$, $K_2O.6TiO_2$, $9Al_2O_3.2B_2O_3$, $KTaO_3$, and $(Bi_2O_3)$-$Me_{m-1}R_mO_{3m+1}$ (Me is an element with a valence of 1 to 3; R is an element with a valence of 4–5).

Preferably, polyaniline, polyacetylene, or polypyrrole is used for the electroconductive polymer.

The same metal as used for the metal strip is preferably used for the sinterable material.

The mixture of ceramic materials and metals is preferably a mixture of one or more substances selected from the aforementioned ceramic materials and one or more substances selected from the aforementioned metals. In this case, the metal also serves as a binder, and the mixing ratio of the ceramic materials and the metals may be arbitrary in suit with the application of the metal-contained composite material.

When using a metal or a mixture of metal and ceramic material as the sinterable material, either a similar metal to the metal strip or a different metal may be used.

After the roll fabrication process described above, a plastic working process is carried out. This plastic working process may be performed immediately after the completion of the preceding process if the sinterable material layer is not formed on the outer end of the rolled metal strip, but if the sinterable material layer is formed on the outer end of the rolled metal strip, the metal strip is wrapped around the roll or the roll is fitted into a metal tube made of the same metal as used for the metal strip or of a different metal, before the plastic working process is carried out.

The plastic working process may be operated by a rolling or drawing, and the working temperature may be hot, warm, or cold, depending on the type of the material used. In addition to the above plastic working methods, pressure working methods such as a CIP (cold isostatic pressing), HIP (hot isostatic pressing), hot pressing, or cold pressing may be applied. A process annealing may preferably be carried out in the middle of the plastic working, to eliminate working strain and thus improve the product quality.

Figure 3:
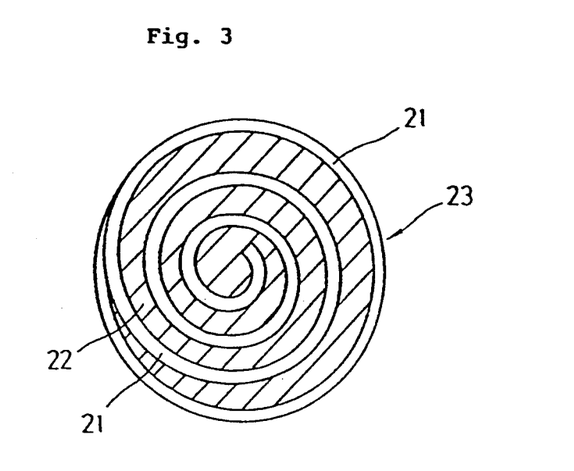
FIG. 3 is a sectional view of a metal-contained composite material obtained by the method of the invention without a core when producing a roll.
Figure 4:
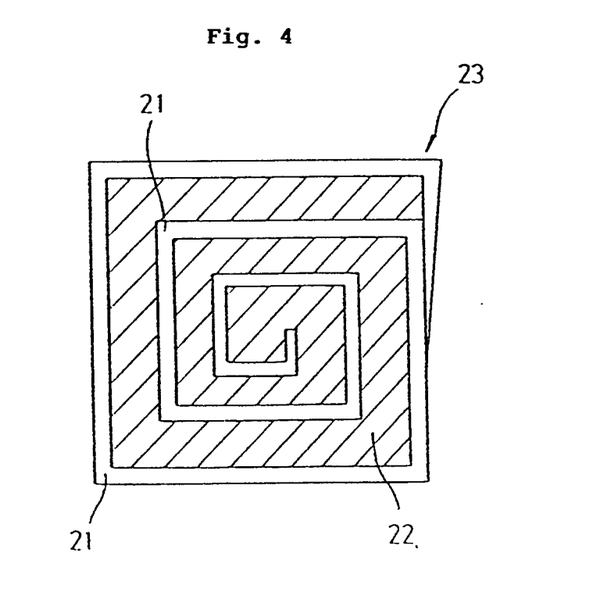
FIG. 4 is a sectional view of a metal-contained composite material obtained by the method of the invention without a core when producing a roll.
Figure 5:
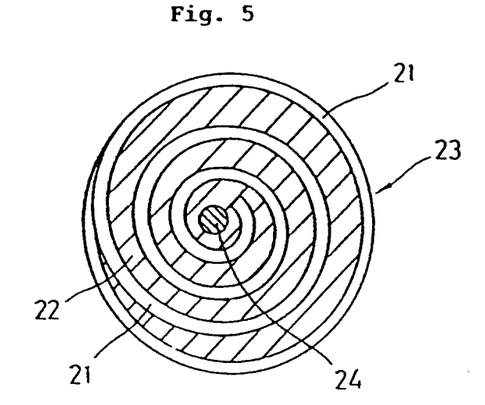
FIG. 5 is a sectional view of a metal-contained composite material obtained by the method of the invention using a core when producing a roll.
Figure 6:
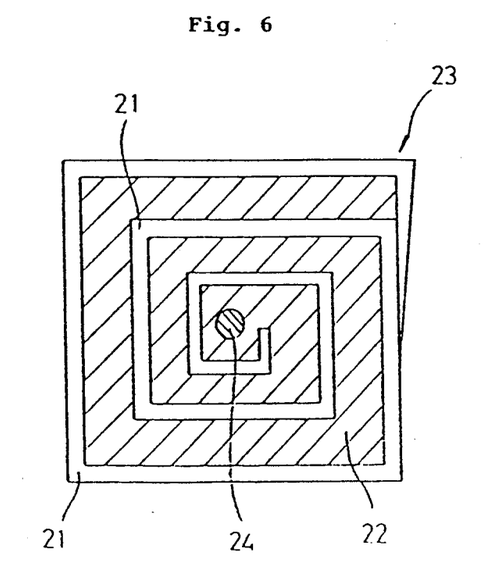
FIG. 6 is a sectional view of a metal-contained composite material obtained by the method of the invention using a core when producing a roll.

Due to the plastic working, a wirelike metal-contained composite material 23 composed of a metal layer (metal strip) 21 and a sinterable material layer 22, both extending longitudinally, is obtained (see FIGS. 3 and 4). When a core is used, a metal-contained composite material composed of a central metal (core) 24, a longitudinally extending metal layer (metal strip) 21, and a sinterable material layer 22, as shown in FIGS. 5 and 6, is obtained.

According to this invention, a compression process may further be effected after the plastic working process.

Figure 7:
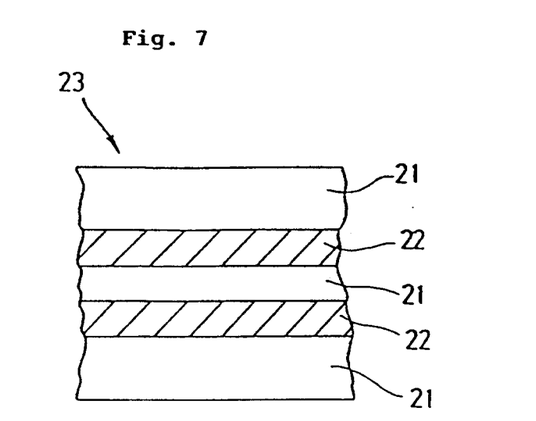
FIG. 7 is a partially sectional view of the metal-contained composite material of FIG. 3 which has been worked into a plate.
Figure 8:
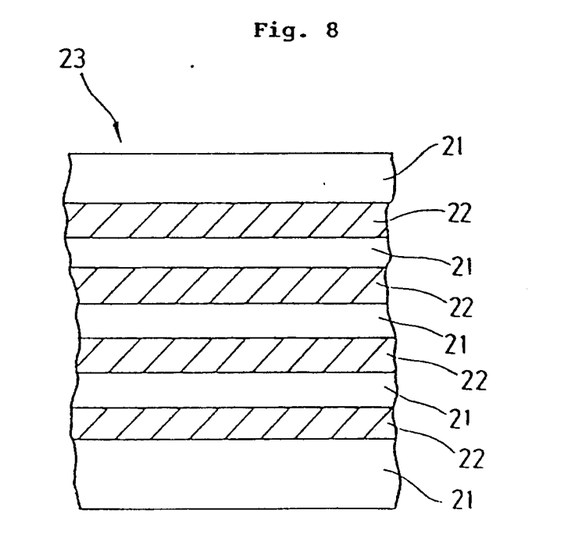
FIG. 8 is a partially sectional view of the metal-contained composite material of FIG. 3 which has been worked into a plate.

In this compression process, as shown in FIG. 3 through FIG. 6, the metal-contained composite material undergoes compression by pressing or rolling. Due to this compression process and by suitably cutting the compressed sheet as required, platelike metal-contained composite members can be obtained (see FIGS. 7 and 8).

According to the method of this invention, two spray guns, one for the sinterable material and the other for the metal, may be provided in the apparatus for producing a roll, shown in FIG. 1, such that two or more sinterable powders, e.g., ceramic powder and metal powder, are alternately sprayed on one surface of the metal strip while the metal strip is wound up. By subjecting the thus-obtained roll to plastic working, a wirelike metal-contained composite material 33, which is composed of a longitudinally extending metal layer (metal strip) 31a, and ceramic layers 32 and metal layers (i.e., sprayed metal, enclosed by solid lines in FIG. 9 without shading) 31b longitudinally extending and located alternately in the circumferential direction, can be obtained (see FIG. 9).

Figure 9:
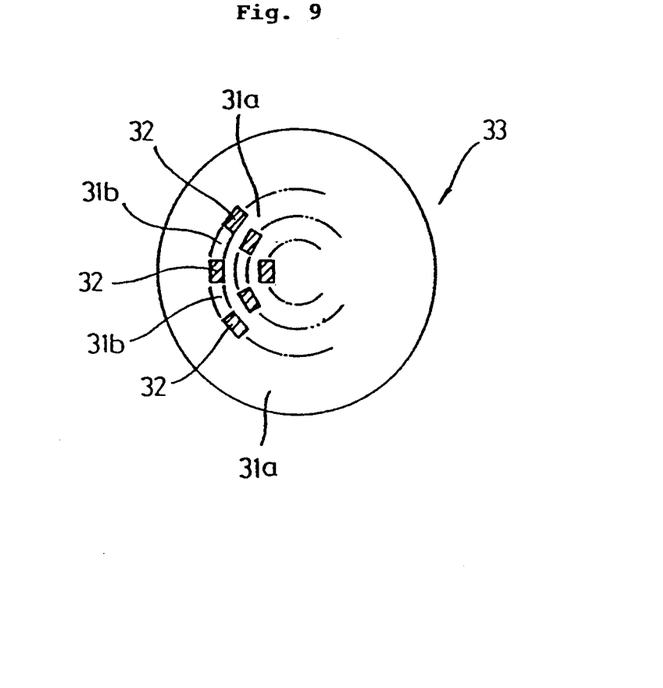
FIG. 9 is a sectional view of a metal-contained composite material obtained according to the method of this invention.
Figure 10:
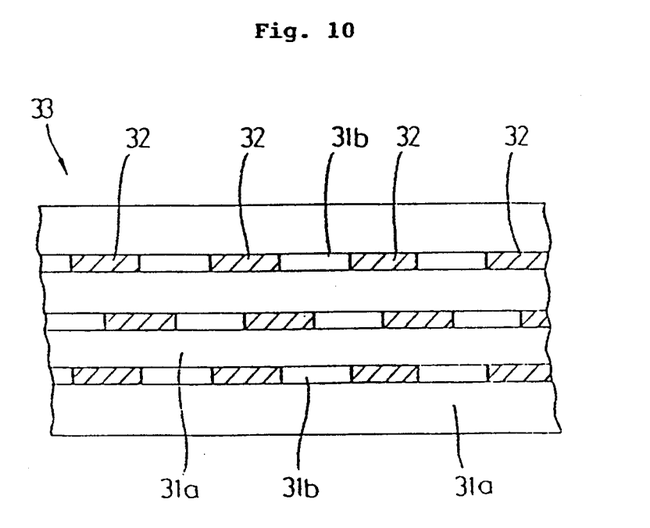
FIG. 10 is a partially sectional view of the metal-contained composite material of FIG. 9 which has been worked into a plate.

The metal-contained composite material shown in FIG. 9 may be subjected to compression to obtain a metal-contained composite plate (see FIG. 10).

The metal-contained composite material produced by the method of this invention has at least a portion of the outer surface thereof made of a metal layer, and has interior or innards thereof composed of the metal layer and a sinterable material layer, which extend longitudinally and alternate with each other.

Since a portion of the outer surface of the metal-contained composite material produced by the method of this invention is constituted by a metal layer, the composite material more excels in weldability, solderability and platability than MFRCs and the like.

Further, the method of this invention permits an easy selection of the structure and compounding ratio of the metal and the sinterable material, and accordingly, a composite material having properties suited to specific use can be easily produced.

Furthermore, the metal-contained composite material produced by the method of this invention has a sinterable material layer extending in the longitudinal direction, and thus has excellent electrical properties.

To achieve aforesaid objects, this invention further provides a method of manufacturing a metal-contained composite material, characterized by comprising: a process of obtaining a roll of a laminate, prepared by a lamination of a sinterable material on one surface of a metal strip, by winding up the laminate on itself or around a core; a process of drawing the resultant roll; and a process of heating the drawn roll at a temperature higher than a sintering temperature of the sinterable material and lower than a melting point of the metal constituting the metal strip.

In this method of the invention, a heating process is operated, in addition to the roll preparation process and plastic working process mentioned above.

The heating process is carried out at a temperature higher than the sintering temperature of the sinterable material used and lower than the melting point of the metal forming the metal strip. The heating process may be effected under pressure.

In the heating process, heat may be provided by HIP, electric furnace, burner, lamp, laser, or self-reaction.

The heat treatment time may be set in accordance with the type and quantity of the sinterable material and the temperature used.

The metal-contained composite material produced by this method of the invention has at least a portion of the outer surface thereof made of a metal layer, and has the interior thereof composed of the metal layer and a sinterable material layer longitudinally extending and separated from each other.

Since the metal-contained composite material is obtained through a heating process effected within the predetermined temperature range, the sinterable material layer of the composite material can be made dense and homogeneous, and thus the mechanical and electrical properties are further enhanced, compared with those which are not subjected to heating process. Particularly, when a substance having high crystalline anisotropy is used as the sinterable material, the crystals can be oriented in optimum directions, which is practically advantageous.

BEST MODE OF CARRYING OUT THE INVENTION

This invention will be described hereinafter in more detail with several examples. It is noted that this invention should not be limited to the following examples.

EXAMPLE 1

A Cu-TiN based composite material was produced by using the apparatus shown in FIG. 1.

First, a Cu tape of 0.05 mm thick was fed in one direction, and was tightly wound around a Cu rod having a diameter of 3 mm while a TiN layer of 15 $\mu$m thick was formed on a surface of the Cu tape by a plasma CVD method, to obtain a spirally wound roll of the laminate (with 200 turns in total). The conditions for the formation of the TiN layer by the plasma CVD method were as follows: The processing system was sealed, and in this system, a hydrogen gas as a carrier gas was made to flow at 30 ml/sec and a nitrogen gas and a titanium tetrachloride gas, as material gases, were made to flow at 1.5 ml/sec and 0.4 ml/sec, respectively. The internal pressure of the system was maintained at 0.4 Torr, and the Cu tape was heated to 500° C. Further, high-frequency waves of 13.56 MHz were adopted to secure an output of 1.5 kW in producing a plasma.

Subsequently, the obtained roll was fitted into a Cu pipe having an inner diameter of 32 mm and a thickness of 1 mm, and then subjected to a HIP process for 4 hours under the conditions of 700° C. and 2,000 atm. Then, a drawing process was effected by a hot extrusion at 700° C. and using a draw bench, to thereby obtain a rodlike Cu-TiN based composite material having a diameter of 7.5 mm.

This composite material was sliced, the cut surface was subjected to an abrasion test with a load of 10 g and a sliding speed of 10 cm/sec, and also a contact voltage drop was measured in the electrified state at 0.1 A. The results are shown in TABLE 1.

EXAMPLE 2

An Ag-ZrN based composite material was produced by using the apparatus shown in FIG. 1.

First, an Ag tape of 0.05 mm thick was fed in one direction, and was tightly wound around an Ag rod having a diameter of 3 mm while a ZrN layer of 15 $\mu$m thick was formed on a surface of the Ag tape by a laser beam sputtering method, to obtain a spirally wound roll of the laminate (with 200 turns in total). The conditions for the formation of the ZrN layer by the laser beam sputtering method were as follows: The processing system was sealed and a nitrogen atmosphere (gas pressure: $10^{-4}$ Torr) was produced therein. ZrN was used as a target, and a 500 W-output $CO_2$ laser (wavelength: 10.6 $\mu$m) and a 30 W KrF excimer laser (wavelength: 248 nm) were used as beam sources. The Ag tape was preheated to 550° C., the target was sputtered with the longer-wavelength laser beam, and then the particles were irradiated with the shorter-wavelength laser beam, to thereby form a ZrN layer.

Subsequently, the obtained roll was fitted into an Ag pipe having an inner diameter of 32 mm and a thickness of 1 mm, and then subjected to a HIP process for 4 hours under the conditions of 700° C. and 2,000 atm. Then, a drawing process was effected by a hot extrusion at 700° C. and using a draw bench, to thereby obtain a rodlike Ag-ZrN based composite material having a diameter of 7.5 mm. The obtained composite material was subjected to tests similar to those conducted with respect to EXAMPLE 1, the results being shown in TABLE 1.

EXAMPLE 3

A Ni-TiB$_2$ based composite material was produced by using the apparatus shown in FIG. 1.

First, a Ni tape of 0.1 mm thick was fed in one direction, and was closely wound around a Ni rod having a diameter of 5 mm while a TiB$_2$ layer of 0.05 mm thick was formed on a surface of the Ni tape by a plasma spraying method, to obtain a spirally wound roll of the laminate (with 200 turns in total).

Subsequently, the obtained roll was fitted into a Ni pipe having an inner diameter of 72 mm and a thickness of 2 mm, and then subjected to a HIP process for 4 hours under conditions of 800° C. and 2,000 atm. Then, a drawing process was effected by a hot extrusion at 800° C. and using a draw bench, to thereby obtain a rodlike composite material having a diameter of 7.5 mm.

EXAMPLE 6

A Ni-TiB$_2$ based composite material was obtained, following the same procedures as those employed in EXAMPLE 3 except that the final HIP process was omitted. The obtained composite material was subjected to the same tests as those conducted on EXAMPLE 1, the results being shown in TABLE 1.

EXAMPLE 7

A Ni-NiB$_2$-PdB based composite material was obtained, following the same procedures as those employed in EXAMPLE 4 except that the final HIP process was omitted. The obtained composite material was subjected to the same tests as those conducted with respect to EXAMPLE 1. The results are shown in TABLE 1.

CONTROL 1

A Ni-3 vol % ThO$_2$ based dispersion alloy was obtained by an ordinary powder metallurgy technique. The obtained composite material was subjected to the same tests as those conducted with respect to EXAMPLE 1. The results are shown in TABLE 1.

TABLE 1

| | COMPOSITE STRUCTURE | | HEATING PROCESS | AMOUNT OF ABRASION | VOLTAGE DROP |
|---|---|---|---|---|---|
| | COMPOSITION | STRUCTURE | (YES, NO) | (mm/100 H) | (mV) |
| EXAMPLE 1 | Cu—TiN | FIG. 5 TYPE | NO | 1.2 | 19 |
| EXAMPLE 2 | Ag—ZrN | FIG. 5 TYPE | NO | 1.2 | 19 |
| EXAMPLE 3 | Ni—TiB$_2$ | FIG. 5 TYPE | YES | 0.9 | 22 |
| EXAMPLE 4 | Ni—NiB$_2$—PdB | FIG. 5 TYPE | YES | 0.9 | 15 |
| EXAMPLE 5 | Ni—TiB$_2$ | FIG. 6 TYPE | YES | 0.9 | 21 |
| EXAMPLE 6 | Ni—TiB$_2$ | FIG. 5 TYPE | NO | 2.0 | 25 |
| EXAMPLE 7 | Ni—NiB$_2$—PdB | FIG. 5 TYPE | NO | 1.6 | 19 |
| CONTROL 1 | Ni—ThO$_2$ | DISPERSION TYPE | NO | 2.4 | 58 |

Thereafter, this composite material was further subjected to a HIP process for 18 hours under conditions of 1,300° C. and 2,000 atm, and a Ni-TiB$_2$ based composite material was obtained. The obtained composite material was subjected to the same tests as those conducted with respect to EXAMPLE 1. The results are shown in TABLE 1.

EXAMPLE 4

A Ni-NiB$_2$-PdB based composite material was obtained, following the same procedures as those employed in EXAMPLE 3 except that a mixture of NiB$_2$ and PdB, mixed in the ratio 1:1 (by weight), was used instead of TiB$_2$. The obtained composite material was subjected to tests similar to those conducted on EXAMPLE 1, the results being shown in TABLE 1.

EXAMPLE 5

A 6.6×6.6 mm-square composite material was obtained, following the same procedures as those employed in EXAMPLE 3 except that a rolling process was effected by a caliber rolling mill instead of the drawing process using a draw bench. The composite material was subjected to a HIP process for 18 hours under conditions of 1,300° C. and 2,000 atm, thereby obtaining a Ni-TiB$_2$ based composite material. The obtained composite material was subjected to the same tests as those conducted with respect to EXAMPLE 1, the results being shown in TABLE 1.

EXAMPLE 8

An Ag-(Bi$_4$Ti$_3$O$_{12}$+Nb) based composite material was produced, following the same procedures as those employed in EXAMPLE 1.

First, an Ag tape of 0.2 mm thick was fed in one direction, and was closely wound up while a Bi$_4$Ti$_3$O$_{12}$+Nb layer of 0.07 mm thick was formed on a surface of the Ag tape by a plasma spraying method, to obtain a spirally wound roll of the laminate (with 20 turns in total).

Subsequently, the obtained roll was fitted into an Ag pipe having an inner diameter of 12 mm and a thickness of 1 mm, and then subjected to a HIP process for 4 hours under conditions of 800° C. and 2,000 atm. Then, a drawing process was effected by a hot extrusion at 800° C. and using a draw bench, to thereby obtain a rodlike Ag-(Bi$_4$Ti$_3$O$_{12}$+Nb) based composite material having a diameter of 7 mm.

Then, a chip of 1 mm thick was cut off from the composite material, and was measured as to the dielectric constant, dissipation factor, breakdown voltage, and density. The measurement results are shown in TABLE 2.

EXAMPLE 9

The composite material obtained according to EXAMPLE 8 was further subjected to a HIP process for 20 hours under conditions of 950° C. and 2,000 atm, to obtain an Ag-(Bi$_4$Ti$_3$O$_{12}$+Nb) based composite material. This composite material was measured as to the same items as those for EXAMPLE 8, the results being shown in TABLE 2.

EXAMPLE 10

An Ag-BaTiO$_3$ based composite material was produced by using the apparatus shown in FIG. 1.

First, an Ag tape of 0.1 mm thick was fed in one direction, and was closely wound up while a BaTiO$_3$ layer of 10 μm thick was formed on a surface of the Ag tape by an a.c. magnetron sputtering method, to obtain a spirally wound roll of the laminate (with 40 turns in total). The conditions for the formation of the BaTiO$_3$ layer by the a.c. magnetron sputtering method were as follows: The processing system was sealed and an atmosphere (internal pressure: 10 mTorr) was produced therein such that O$_2$ and Ar were made to flow in the ratio 0.5 (=O$_2$/(Ar+O$_2$)). BaTiO$_3$ was used as a target, the Ag tape was heated to 600° C., and an output of 1 kW was used.

CONTROL 2

A slurry was prepared by adding a binder to a material powder of Bi$_4$Ti$_3$O$_{12}$+Nb, and using this slurry, a green sheet of 40 μm thick was prepared by a doctor blade method, and 10 mm-square pieces were punched out. Ag paste, which is to serve as an internal electrode, was printed on a surface of each piece punched out from the green sheet, and 20 pieces with the electrode thereon were stacked up and press-bonded together. The stacked body was out, and baked at 950° C. Then, an Ag electrode was baked over the entire exposed portions of the internal electrodes at both ends of the stacked structure, to form external electrodes, whereby a stacked-chip type capacitor having a conventional structure is obtained (Bi$_4$Ti$_3$O$_{12}$+Nb is a dielectric). This capacitor was subjected to the same tests as those conducted with respect to EXAMPLE 8, the results being shown in TABLE 2.

TABLE 2

| | COMPOSITE MATERIAL | | HEATING PROCESS | DIELECTRIC CONSTANT |
|---|---|---|---|---|
| | COMPOSITION | STRUCTURE | (YES, NO) | ($\epsilon_s$) |
| EXAMPLE 8 | Ag—(Bi$_4$Ti$_3$O$_{12}$ + Nb) | FIG. 3 TYPE | NO | 1200 |
| EXAMPLE 9 | Ag—(Bi$_4$Ti$_3$O$_{12}$ + Nb) | FIG. 3 TYPE | YES | 1500 |
| EXAMPLE 10 | Ag—BaTiO$_2$ | FIG. 3 TYPE | NO | 2500 |
| EXAMPLE 11 | Ag—(Bi$_4$Ti$_3$O$_{12}$ + Nb) | FIG. 4 TYPE | NO | 1200 |
| EXAMPLE 12 | Ag—(Bi$_4$Ti$_3$O$_{12}$ + Nb) | FIG. 4 TYPE | YES | 1500 |
| CONTROL 2 | Ag—(Bi$_4$Ti$_3$O$_{12}$ + Nb) | STACKED TYPE | — | 1000 |

| | DISSIPATION FACTOR tan δ (%) | BREAKDOWN VOLTAGE (kV) | DENSITY (g/cm$^3$) | MANUFACTURING COST (LOW, HIGH) |
|---|---|---|---|---|
| EXAMPLE 8 | 1.0 | 50 | 8.0 | LOW |
| EXAMPLE 9 | 1.5 | 60 | 8.5 | LOW |
| EXAMPLE 10 | 1.2 | — | 5.6 | LOW |
| EXAMPLE 11 | 1.0 | 50 | 8.0 | LOW |
| EXAMPLE 12 | 1.5 | 60 | 8.5 | LOW |
| CONTROL 2 | 0.6 | 45 | 7.4 | HIGH |

Subsequently, the obtained roll was fitted into an Ag pipe having an inner diameter of 10 mm and a thickness of 0.8 mm, and then subjected to a HIP process for 4 hours under conditions of 800° C. and 2,000 atm. Then, a drawing process was effected by a hot extrusion at 800° C. and using a draw bench, to thereby obtain a rodlike Ag-BaTiO$_3$ composite material having a diameter of 7 mm. The obtained composite material was subjected to the same tests as those conducted with respect to EXAMPLE 8. The results are shown in TABLE 2.

EXAMPLE 11

A 6.6×6.6 mm-square Ag-(Bi$_4$Ti$_3$O$_{12}$+Nb) based composite material was obtained, following the same procedures as those employed in EXAMPLE 8 except that a rolling process was effected by a caliber rolling mill instead of the drawing process using a draw bench. The obtained composite material was subjected to the same tests as those conducted on EXAMPLE 8, the results being shown in TABLE 2.

EXAMPLE 12

The composite material obtained according to EXAMPLE 11 was further subjected to a HIP process for 20 hours under conditions of 950° C. and 2,000 atm, to obtain a square Ag-(Bi$_4$Ti$_3$O$_{12}$+Nb) based composite material. This composite material was measured as to the same items as those for EXAMPLE 8, the measurement results being shown in TABLE 2.

EXAMPLE 13

A Ti-Al$_2$O$_3$ based composite material having a Mn-Zn based ferrite core rod was produced by using the apparatus shown in FIG. 1.

First, a Ti tape of 0.1 mm thick was fed in one direction, and was closely wound around a Mn-Zn based ferrite rod having a diameter of 5 mm while an Al$_2$O$_3$ layer of 0.04 mm thick was formed on a surface of the Ti tape by a plasma spraying method, to obtain a spirally wound roll of the laminate (with 50 turns in total).

Subsequently, the obtained roll was fitted into a Ni pipe having an inner diameter of 23 mm and a thickness of 1 mm, and then subjected to a HIP process for 4 hours under conditions of 750° C. and 2,000 atm. Then, a drawing process was effected by a hot extrusion at 750° C. and using a draw bench, to thereby obtain a rodlike Ti-Al$_2$O$_3$ based composite material having a diameter of 7 mm.

The obtained composite material was evaluated as to the Q (quality) factor at 10 kHz in room temperature, the breakdown voltage, and the allowable maximum temperature (the maximum temperature at which neither the Q factor nor the breakdown voltage are lowered even if the material is maintained at that temperature for 2 hours). The measurement results are shown in TABLE 3.

EXAMPLE 14

The composite material obtained according to EXAMPLE 13 was further subjected to a HIP process for 20 hours under conditions of 1,400° C. and 2,000 atm, to obtain a Ti-Al$_2$O$_3$ based composite material. The obtained composite material was subjected to the same tests as those conducted on EXAMPLE 13, the results being shown in TABLE 3.

CONTROL 3

A mica tape and a Cu tape, each having a thickness of 10 mm, were alternately closely wound around a Mn-Zn based ferrite rod having a diameter of 5 mm, to obtain 50 turns for each of the two tapes, and the outer end of the tape was fixed, thereby obtaining a coil. This coil was subjected to the same tests as those conducted with respect to EXAMPLE 13. The results are shown in TABLE 3.

TABLE 3

| | COMPOSITE MATERIAL | | HEATING PROCESS | Q FACTOR at 10 kHe in | BREAKDOWN VOLTAGE | ALLOWABLE MAXIMUM |
|---|---|---|---|---|---|---|
| | COMPOSITION | STRUCTURE | (YES, NO) | room temp | (kV) | TEMPERATURE °C. |
| EXAMPLE 13 | Ti—Al$_2$O$_3$ | FIG. 5 TYPE | NO | 800 | 8 | 600 |
| EXAMPLE 14 | Ti—Al$_2$O$_3$ | FIG. 5 TYPE | YES | 1600 | 10 | 600 |
| EXAMPLE 15 | Ag—BaTiO$_2$ | FIG. 5 TYPE | NO | 1200 | 9 | 600 |
| EXAMPLE 16 | Ti—Al$_2$O$_3$ | FIG. 6 TYPE | NO | 800 | 8 | 600 |
| EXAMPLE 17 | Ti—Al$_2$O$_3$ | FIG. 6 TYPE | YES | 1600 | 10 | 600 |
| CONTROL 3 | MICA + Cu | — | — | 200 | 1.5 | 450 |

EXAMPLE 15

A Cu-MgO based composite material was produced by using the apparatus shown in FIG. 1.

First, a Cu tape of 0.1 mm thick was fed in one direction, and was closely wound around a Mn-Zn based ferrite rod having a diameter of 5 mm while a MgO layer of 10 μm thick was formed on a surface of the Cu tape by an ion plating method, to obtain a spirally wound roll of the laminate (with 50 turns in total). The conditions for the formation of the MgO layer by the ion plating method were as follows: The processing system was sealed, Mg was evaporated at a volumetric rate of 500 Å/sec, and O$_2$ was ionized by an ionization mechanism comprising a RF coil and applied onto the Cu tape. The Cu tape was heated to 500° C.

Subsequently, the obtained roll was fitted into a Cu pipe having an inner diameter of 23 mm and a thickness of 1 mm, and then subjected to a HIP process for 4 hours under conditions of 750° C. and 2,000 atm. Then, a drawing process was effected by a hot extrusion at 750° C. and using a draw bench, to thereby obtain a rodlike Cu-MgO based composite material having a diameter of 7 mm. The obtained composite material was subjected to the same tests as those conducted with respect to EXAMPLE 13, the results being shown in TABLE 3.

EXAMPLE 16

A 6.6×6.6 mm-square Ti-Al$_2$O$_3$ based composite material (with a Mn-Zn based ferrite core rod) was obtained, following the same procedures as those employed in EXAMPLE 13 except that a rolling process was effected by a caliber rolling mill instead of the drawing process using a draw bench. The obtained composite material was subjected to the same tests as those conducted on EXAMPLE 13. The results are shown in TABLE 3.

EXAMPLE 17

The composite material obtained according to EXAMPLE 16 was further subjected to a HIP process for 20 hours under conditions of 1,400° C. and 2,000 atm, to obtain a Ti-Al$_2$O$_3$ based composite material having a Mn-Zn based ferrite core rod. The obtained composite material was subjected to the same tests as those conducted on EXAMPLE 13, the results being shown in TABLE 3.

INDUSTRIAL APPLICABILITY

The metal-contained composite material produced according to the method of this invention can be used for machine parts, electrical sliding contact materials, electrical and thermal conductors, and materials for electromagnetic shielding members.

We claim:

1. A method of manufacturing a metal-contained composite material, comprising the steps of;
   fabricating a roll of a laminate by laminating at least one sinterable material on one surface of a metal strip to form a laminate, and thereafter winding up the laminate with or without a core to form the roll of the laminate; and thereafter
   subjecting the roll to plastic working.

2. The method according to claim 1, wherein a core is used and said core is made of a metal identical to or different from the metal of the metal strip.

3. The method according to claim 1, wherein said step of fabricating a roll comprises the operation of winding the metal strip simultaneously with the step of laminating at least one sinterable material on one surface of the metal strip.

4. A method according to claim 1, wherein the step of laminating the sinterable material comprises applying the sinterable material to the metal strip by plasma spraying, PVD, CVD spray pyrolysis, printing, dip coating, slurry application, and electrophoretic deposition.

5. The method according to claim 1, wherein said plastic working is rolling or drawing.

6. The method according to claim 1, which further comprises a compression step to be carried out after said plastic working step.

7. The method according to claim 2, wherein the core is made of said identical metal to the metal strip.

8. The method according to claim 1, wherein said plastic working is hot pressing or cold pressing.

9. The method according to claim 8, wherein said plastic working is hot isotactic pressing or cold isotactic pressing.

10. The method according to claim 1, wherein
    the metal strip is an alloy of Ag-Pd, Cu-Zn, Cu-Sn, Cu-Ni, Fe-Ni, Fe-Ni-Co, or Mo-Cr-Fe, and
    the ceramic is Al$_2$O$_3$. SiC, ZrO$_2$, MgO, BaTiO$_3$, Fe$_2$O$_3$, MoS$_2$, WC, TiC, TiB$_2$, TiN, AlN, soda-lime glass, lead glass, MoSi, ZnN, ZrC, ZrB$_2$, PbTiO$_3$, NaTaO$_3$, KNSO$_3$, NaNbO$_3$, K$_2$O.6TiO$_2$, 9Al$_2$O$_3$.B$_2$O$_3$ and KTaO$_3$.

11. The method according to claim 1, wherein
the metal strip is an alloy of stainless steel and
the ceramic is Al$_2$O$_3$. SiC, ZrO$_2$, MgO, BaTiO$_3$, Fe$_2$O$_3$, MoS$_2$, WC, TiC, TiB$_2$, TiN, AlN, soda-lime glass, lead glass, MoSi, ZnN, ZrC, ZrB$_2$, PbTiO$_3$, NaTaO$_3$, KNSO$_3$, NaNbO$_3$, K$_2$O.6TiO$_2$, 9Al$_2$O$_3$.B$_2$O$_3$ and KTaO$_3$.

12. A method of manufacturing a metal-contained composite material, comprising the steps of:
fabricating a roll of a laminate prepared by laminating at least one sinterable material on one surface of a metal strip, and thereafter winding up the laminate with or without a core to form the roll;
drawing the roll; and thereafter
heat treating the drawn roll at a temperature higher than a sintering temperature of the sinterable material and lower than a melting point of the metal constituting the metal strip.

13. The method according to claim 12, wherein said core is made of a metal identical to or different from the metal of the metal strip.

14. The method according to claim 12, wherein said process of fabricating a roll, comprises the operation of winding the metal strip with or without the core while simultaneously laminating at least one sinterable material on one surface of the metal strip.

15. The method according to claim 12, wherein the laminating of the sinterable material comprises applying the sinterable material to the metal strip by plasma spraying, PVD, CVD, spray pyrolysis, printing, dip coating, slurry application, and electrophoretic deposition.

16. The method according to claim 12, wherein said sinterable material is one or more substances selected from the group consisting of ceramic materials, metals, and a mixture of ceramic materials and metals.

17. The method according to claim 12, wherein said plastic working is rolling, drawing, hot pressing or cold pressing.

18. The method according to claim 12, which further comprises a compression step to be carried out after said plastic working step.

19. The method according to claim 12, wherein said heating process is effected by using an HIP, an electric furnace, a burner, a lamp, a laser, or self-reaction.

20. The method according to claim 12, wherein said plastic working is cold isotactic pressing or hot isotactic pressing.

21. The method according to claim 12, wherein
the metal strip is Cu, Al, Ag, Au, Fe, Ni, Co, W, Mo, Nb, Ta, Ti, Zr, or an alloy of two or more thereof, and
the ceramic is Al$_2$O$_3$. SiC, ZrO$_2$, MgO, BaTiO$_3$, Fe$_2$O$_3$, MoS$_2$, WC, TiC, TiB$_2$, TiN, AlN, soda-lime glass, lead glass, MoSi, ZnN, ZrC, ZrB$_2$, PbTiO$_3$, NaTaO$_3$, KNSO$_3$, NaNbO$_3$, K$_2$O.6TiO$_2$, 9Al$_2$O$_3$.B$_2$O$_3$ and KTaO$_3$.

22. The method according to claim 21, wherein the metal strip is Cu and the ceramic is TiN.

23. A method of manufacturing a metal-contained composite material, comprising the steps of;
fabricating a roll of a laminate by laminating at least one sinterable material on one surface of a metal strip to form a laminate, and thereafter winding up the laminate with or without a core to form the roll of the laminate; and thereafter
subjecting the roll to plastic working, and wherein said sinterable material contains a mixture of ceramic materials and metals.

24. A method of manufacturing a metal-contained composite material, comprising the steps of;
fabricating a roll of a laminate by laminating at least one sinterable material on one surface of a metal strip to form a laminate, and thereafter winding up the laminate with or without a core to form the roll of the laminate; and thereafter
subjecting the roll to plastic working, and wherein said sinterable material contains ceramic materials, electrochemical polymers, or metals.

25. The method according to claim 24, wherein said sinterable material contains electroconductive polymers.

26. The method according to claim 25, wherein said sinterable material contains metals.

27. A metal-contained composite material, comprising an innards thereof made of a lamination of a metal layer and a layer of sinterable material, which is spirally wound to form a roll, and a metallic pipe surrounding said spirally wound roll of the lamination.

28. A metal-contained composite material, comprising a lamination of a metal layer and a layer of sinterable material, which is spirally wound to form a roll, said spirally wound roll having an end portion of the lamination on the outermost thereof, at which said sinterable material layer is not formed on an inner surface of said metal layer, and said inner surface of said metal layer abuts on an outer surface thereof.

29. The method according to claim 24, wherein said sinterable material contains ceramic materials.

* * * * *